June 29, 1965   D. W. HAMM   3,191,946
PISTON RINGS
Filed July 25, 1962   2 Sheets-Sheet 1
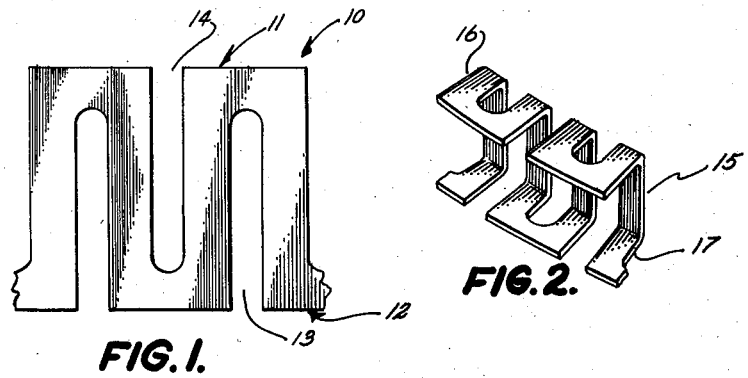
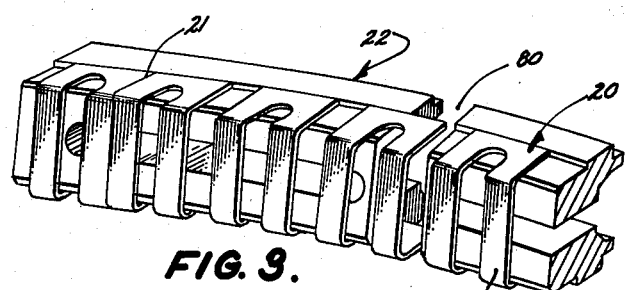
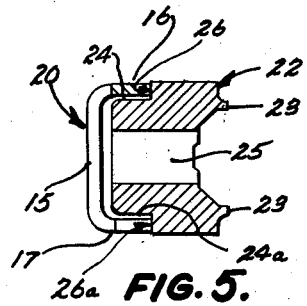 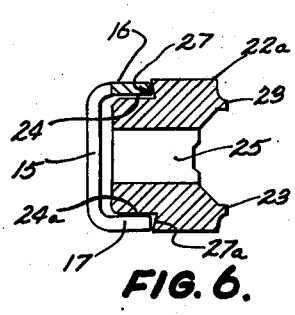 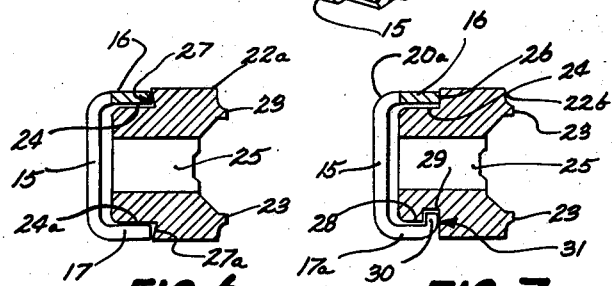
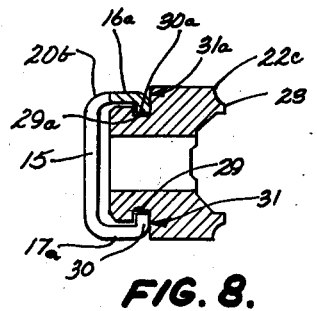 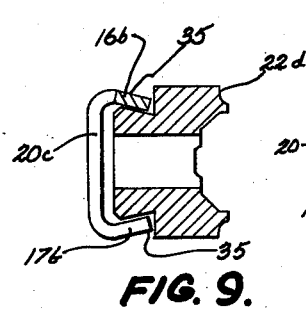 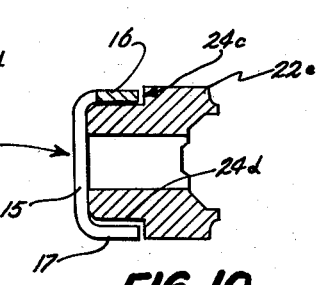
INVENTOR.
DOUGLAS W. HAMM
BY
ATTORNEYS June 29, 1965  D. W. HAMM  3,191,946
PISTON RINGS Filed July 25, 1962  2 Sheets-Sheet 2

INVENTOR.
DOUGLAS W. HAMM
BY
ATTORNEYS

| United States Patent Office | 3,191,946 |
|---|---|
| | Patented June 29, 1965 |

3,191,946
PISTON RINGS
Douglas W. Hamm, Norton Township, Muskegon County, Mich., assignor to Muskegon Piston Ring Company, Muskegon, Mich., a corporation of Michigan
Filed July 25, 1962, Ser. No. 212,297
3 Claims. (Cl. 277—138)

This invention relates to piston rings, and more particularly to a new type of expander designed to seat behind a piston ring. The expander is characterized by the fact that in its free state, the ends of the expander butt and the tension in the expander is developed by compression of the expander circumferentially behind the piston ring when the parting in the piston ring is closed to permit it to be seated in a cylinder.

While expanders for piston rings are well-known, and the placing of an expander behind a piston ring to impart radial pressure to the piston ring, is old in the art, this invention provides an expander of substantially improved structural and functional characteristics over previously known expanders of this type. Further, its structure has led to the development of a number of novel piston rings of materially improved functional characteristics.

This invention is particularly directed to the combination of an expander and a snap ring. Snap rings of the type referred to in this disclosure are a cast iron ring and within the scope of this disclosure may be used as either a ring or a spacer. Cast snap rings do not generate sufficient radial tension to effect a seal either when used as a ring or an expander-spacer for rails. If their section is made sufficiently heavy to generate the necessary tension, the rings are so rigid that they cannot flex to conform to the cylinder wall to effect a proper seal. If used as an expander for rails, they are too rigid to conform to the rail with the result that their bearing upon the rail is irregular, and the rail is not expanded uniformly. This invention overcomes this by utilizing a highly flexible expander as the radial tension source. This expander exerts its force at a large number of uniformly spaced points throughout its circumference.

The expander is simple in structure, relatively inexpensive to manufacture and easy to keep within acceptable tolerance limits. By virtue of its structure, it has excellent tension-retaining properties. Further, because it obtains its tension by being compressed circumferentially, its tension-retaining properties are even further enhanced. The shape and design of the expander provides a form of contact with the ring which reduces the incident of wear to a minimum. Further, it exerts its radial pressure against the ring at a large number of points and by virtue of its structure the amount of pressure delivered at each point of contact is uniform because the expander can be made free of irregularities in both shape and tension characteristics.

An important feature of this invention is the fact that the design of the expander permits it to be telescoped over the ring. Thus, valuable groove space is saved by using the same space both for the expander and for the ring. The groove depth can be accordingly reduced without in any way interfering with the efficiency of either the ring or the expander. This permits the pistons to have thinner walls and thus materially reduce their weight. This latter is a significant factor not only in improving the weight to power ratio, but also in improving the overall efficiency of the engine. This expander provides its tension and radial pressure as an inherent characteristic of its structure and therefore, does not have to bear against the bottom of the ring groove for this purpose. By eliminating the necessity of making bearing contact with the bottom of the ring groove, not only is the incident of wear reduced, but the ring assembly is afforded substantially greater freedom since its movement is not restricted by the friction incident to such contact.

This invention provides an expander which is adaptable to a wide range of ring widths. This is important because it permits a single basic construction to be utilized in a wide range of circumstances.

These and other objects and purposes of this invention will be readily understood by those acquainted with the design and construction of internal combustion engines upon reading the following specification and the accompanying drawings.

In the drawings:

FIG. 1 is a fragmentary plan view of a blank for the expander of this invention;

FIG. 2 is a fragmentary oblique view of the expander after bending and coiling;

FIG. 3 is a fragmentary oblique view of the expander assembled to a piston ring;

FIG. 5 is a sectional elevation view of the expander assembled to one type of ring;

FIGS. 6 through 11 are sectional elevational views of modified expanders assembled to various types of rings;

Figure 11:
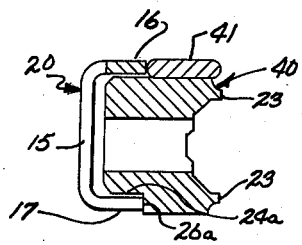

In executing the objects and purposes of this invention, there is provided an expander which in flat pattern is a continuous strip of metal of zig-zag shape. This strip is bent into a cross-section of U-shape with the opposite edges of the blank forming the ends of the legs of the U. This is coiled into circular form with the free ends of the legs extending radially outwardly. The expander, when cut to length, is circular and has a parting but there is no gap at the parting. In this state, it has a diameter greater than the diameter it will have when it is compressed for installation in a cylinder. To circumferentially compress it, it is squeezed to partially close its lateral slots and thus reduce its length. In so doing, it develops substantial tension.

Referring specifically to the drawings, the numeral 10 indicates a blank having a pair of parallel sides 11 and 12. Extending laterally of the blank from the side 12 are spaced slots 13. These extend a major portion of the distance across the blank. Between each pair of slots 13, a second slot 14 is provided which opens through the side 11 of the blank. It also extends a major portion of the distance across the blank. Thus, the blank is a continuous ribbon of metal of zig-zag shape which wanders back and forth across the blank prvoiding continuity of structure first on one side of the blank and then on the other. Thus, it is a plurality of loops with alternate loops having their connecting webs arranged on opposite sides of the blank.

Figures 4, 19:
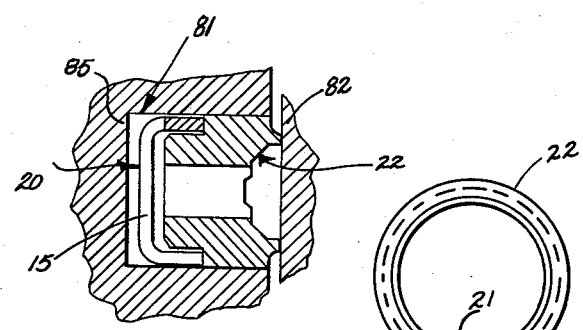
FIG. 4 is a schematic view of a piston ring incorporating this invention showing the expander in free state in solid lines and the expander compressed for installation in broken lines.
FIG. 19 is a sectional elevational view of an expander and ring assembly installed in a ring groove of a piston and seated in a cylinder.

The blank, by means of appropriate equipment, is formed into a U-shape. And so formed, the central portion of the legs of the loops become struts 15 with the ends of the loops forming legs 16 and 17 on opposite ends of the struts. This is coiled into a circular shape and cut to length to form the expander 20. In the coiling, the struts 15 are arranged on the radially inner bight portion of the expander with the legs 16 and 17 extending radially outwardly. As is illustrated in FIG. 4, the expander 20 has a parting 21 but, at the parting, the expander in its normal or released position, has no gap, the ends of the expander being butted even though the expander has not been compressed.

The expander 20 may be assembled to a number of different types of rings. As illustrated in FIG. 5, the expander 20 is mounted behind a single section, cast, snap-type oil ring 22. The oil ring 22 has a pair of radially outwardly projecting ridges 23 which make scraping and sealing engagement with the cylinder wall. The oil ring 22 has a pair of recesses 24 and 24a, one opening through each of its upper and lower faces. Each also opens through the radially inner side of the oil ring. The axial depth of the recesses is such as to receive the legs of the expander 20 while the axial thickness of the oil ring 22 between the recesses is such that this portion of the oil ring may be received within the expander 20 without binding with the inner surfaces of the legs 16 and 17. Since this is an oil ring, it is preferably that it have a central opening 25 to permit the escape of oil from between the ridges 23 to the bottom of the ring groove where it may be ported to the inside of the piston.

In the particular construction illustrated in FIG. 5, there is a slight clearance between the axially facing surfaces of the recesses 24 and 24a, and the legs 16 and 17 respectively. The ends of the legs however, bear against the radially inwardly facing walls 26 and 26a of the recesses 24 and 24a. It is through this engagement that the radial pressure of the expander is transmitted to the oil ring 22.

FIG. 6 illustrates a slight modification of the structure shown in FIG. 5. In this figure, the radially inwardly facing walls 27 and 27a of the recesses 24 and 24a are inclined to provide a slight wedging action in the engagement between the expander and the ring.

In FIG. 7, the expander has been modified as well as the ring to provide partial hooking engagement between the expander and the ring, While the upper leg 16 and recess 24 remain the same, the lower recess 28 is modified by the provision of an axially extending channel 29 at the radially forward end of the recess. The expander is also modified by having its lower leg extended and bent over so that it has an axially extending flange 30 which seats within the channel 29. The radially forward surface of the leg 30 bears against the radially inwardly facing wall 31 of the channel. Thus, the radial pressure of the expander 20a is transmitted to the oil ring 22b by contact between the ends of the leg 16 and the wall 26 and also by contact between the outer surface of the flange 30 and the wall 31 of the channel 29. As in the case of the rings illustrated in FIGS. 5 and 6, the axially extending portions, that is the struts 15, of the expander, are spaced radially from the inner face of the oil ring 22b.

FIG. 8 illustrates a carrying forward of the concept illustrated in FIG. 7. In this construction, the leg 16a at the top of the expander is modified to have a structure corresponding to the leg 17a. The oil ring 22c is also modified to have an axially extending channel 29a and an inwardly facing wall 31a corresponding to the channel 29 and wall 31 respectively on the other side of the ring. In this case, the expander 20b bears against the walls 31 and 31a to exert its radial pressure on the oil ring 22c. The expander is positively locked to the oil ring against radial disengagement by the converging flanges 30 and 30a. This construction, however, does not interfere with relative circumferential movement between the expander and the ring since the ends of the flanges do not bind with the bottoms of the channels 29 and 29a and the inward face of the ring 22c is spaced from the struts 15 of the expander.

FIG. 9 illustrates another modification in which the oil ring 22d has wedge-shaped recesses 35 and 35. The axially facing surfaces of the recesses are inclined to converge outwardly and the legs 16b and 17b of the expander 20c are shaped to converge in a manner corresponding to the recesses 35. Thus, the expander is positively hooked to the ring 22d against radial disengagement but once again, without interference with relative circumferential movement between the ring and the expander.

FIG. 10 illustrates a modification of the structure shown in FIG. 5. In this case, the oil ring 22e has recesses 24c and 24d of greater radial depth than the length of the legs 16 and 17 of the expander 20. Thus, the bearing between the expander and the oil ring 22e occurs between the inner radial face of the oil ring and the struts 15 of the expander. To prevent binding between the radii joining the legs 16 and 17 to the struts 15, the top and bottom edges of the inward side of the oil ring 22e are chamfered. Thus, there is freedom for relative movement circumferentially between the oil ring and the expander.

FIG. 11 illustrates a different application of this invention. In this case, an oil ring-spacer 40 and a thin rail 41 are used with the expander 20. The oil ring-spacer 40 is quite similar to the oil ring 22 except that it has only the bottom recess 24a, the top surface being straight and serving as a seat for the rail 41. The leg 17 of the expander 20 bears against the inwardly facing wall 26a of the recess 24a. The leg 16 seats over the top surface of the oil ring-spacer 40 and bears against the radially inner edge of the rail 41. Thus, the expander exerts radial tension on the lower portion of the expander-spacer and upon the rail 41 serving to force both the expander-spacer and the rail into firm sealing engagement with a cylinder wall. Once again, radial clearance is maintained between the inner face of the expander-spacer and the struts 15 of the expander.

Figure 12:
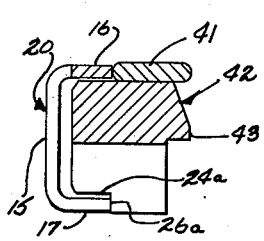
FIGS. 12 through 14 are sectional elevational views of the expander assembled to various types of rings in combination with one or more rails.

FIG. 12 illustrates a similar structure except that the oil ring 42 is modified to eliminate the ridges 23. Substituted for the ridges is a central scraper ridge 43 for engaging a cylinder wall. With the oil ring-spacer 42, the same expander 20 and rail 41 are used and the physical relationship between these components remains the same as in the ring assembly illustrated in FIG. 11.

Figure 13:
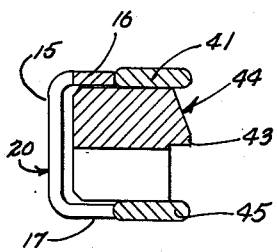

FIG. 13 illustrates a ring assembly quite similar to the one in FIG. 12 except that the oil ring-spacer 44 has flat surfaces on both sides for mounting an upper rail 41 and a lower rail 45.

The oil ring spacer has the same scraper ridge 43. The legs 16 and 17 of the expander 20 embrace both the upper and lower surfaces of the oil ring spacer 44 and their ends make bearing with the rails 41 and 45. Radial spacing is maintained between the inner surface of the oil ring spacer and the struts 15 of the expander. Thus, the radial pressure exerted by the expander is exerted on the rails only and not upon the oil ring spacer 44.

Figure 14:
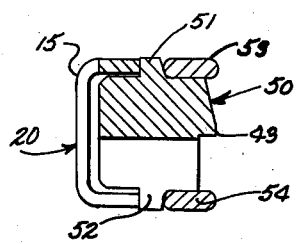

FIG. 14 illustrates a different arrangement in which the oil ring spacer 50 has axially extending projections 51 and 52. These are spaced from both the inner and outer faces of the oil ring spacer. Outwardly of the projections 51 and 52, a pair of rails 53 and 54 are mounted on the oil ring spacer 50. The inner edges of these rails bear against the forward walls of the projections 51 and 52. These walls may be straight or inclined as illustrated. When they are inclined, they create what is termed "wedging-action" forcing the rails into tighter sealing engagement with the sides of the ring groove.

The ends of the legs 16 and 17 of the expander 20 bear against the inner walls of the projections 51 and 52, and the radial pressure of the expander is transmitted to the oil ring at these points. Thus, the radial pressure of the expander is imparted not only to the oil ring spacer, but also to the rails 53 and 54. Once again, the inner face of the spacer oil ring is spaced from the struts 15 of the expander.

Figure 15:
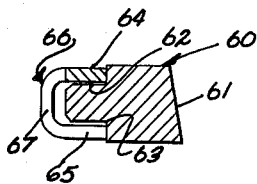
FIG. 15 is a sectional elevational view of the expander assembled to a compression ring.

FIG. 15 illustrates this invention applied to a compression ring. In this case, the compression ring 60 has a conventional taper face 61 while its upper and lower sides are recessed at 62 and 63 along its radially inner portion. The recesses 62 and 63 receive the legs 64 and 65 of the expander 66. Once again, the radial pressure of the expander 66 is transmitted to the compression ring 60 by the bearing between the ends of the legs 64 and 65 and the inwardly facing walls at the outer ends of the recesses 62 and 63. Once again, radial spacing is maintained between the inner face of the compression ring 60 and the struts 67 of the expander 66. The expander 66 is identical to the expander 20 except that the axial spacing between the legs 64 and 65 is reduced since the ring itself is of lesser axial thickness.

Figure 16:
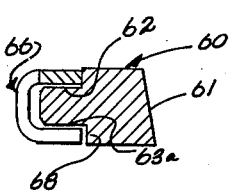
FIG. 16 is a sectional elevation view of the expander assembled to a compression ring in which the compression ring is modified to produce twisting of the ring.
Figure 18:
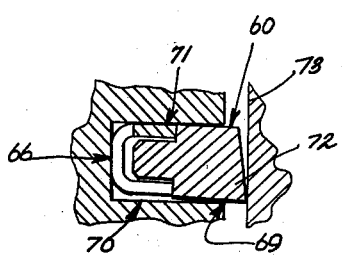
FIG. 18 is a sectional elevation view of the assembly illustrated in FIG. 16 after it has been installed in a ring groove.

FIG. 16 illustrates the same basic ring as FIG. 15 except that in this case, the lower recess 63a of the compression ring 60 is slightly deeper than the recess 62. Thus, the expander 66 makes contact with the inwardly facing wall of the recess 62 before it makes contact with the rearwardly facing wall 68 of the recess 63a. Under the radial pressure exerted by the expander upon the compression ring, this causes the compression ring to reverse twist as illustrated in FIG. 18. This forces the lower surface of the compression ring 60 to form a seal 69 with the outer lower edge of the ring groove 70 and another seal 71 between the upper side of the ring groove and the juncture of the upper side of the compression ring and the inwardly facing wall of the recess 62. At the same time, the expander urges the lower outer corner 72 of the compression ring into firm sealing engagement with the cylinder wall 73.

Figure 17:
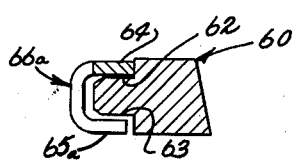
FIG. 17 is a sectional elevation view of an assembly similar to FIG. 16 except that the expander is modified to produce twisting of the ring.

FIG. 17 illustrates another way of executing the principles of the compression ring and expander combination illustrated in FIGS. 16 and 18. In this case, the compression ring 60 is used with recesses 62 and 63 of the same depth. The lower leg 65a of the expander 66a however, is slightly shorter than the upper leg 64. It is obvious that this structure will produce the same result as the structure illustrated in FIG. 16. It will also be obvious that by inverting the expander of the combination illustrated in FIG. 17, the ring can be caused to assume a positive twist rather than a negative or reverse twist.

In all of the ring combinations which have been illustrated and described, the expander functions in the same manner. The length of the expander is such that in its released or normal condition, it forms a complete circle with no gap at the part 21 as illustrated in FIG. 4. However, when it is assembled to a ring having a normally open part 80, such as is illustrated in FIG. 3, the compression of the ring to close the gap or part 80 sufficiently to permit the ring to be installed in a cylinder, will cause the expander to be compressed circumferentially. This is possible because the structure of the expander will permit the ends of each of the loops of the expander and the legs as well as the struts to shift slightly toward each other. In so doing, the resistance of the expander to this type of compression causes it to rapidly build up tension which the expander expresses as radial pressure against the ring within which it is confined. Further, the zig-zag nature of the structure of the expander, assures that this contraction will occur uniformly circumferentially about the expander. Thus, the expander will exert uniform radial pressure upon the confining ring.

Further, the expander being of U-shape cross section with the legs of the U projecting radially outwardly, the expander occupies very little radial depth within the ring groove. It is essential that the expander have substantial radial depth to assure sufficient radial tension and to distribute the deflection of the structure of the expander sufficiently that the expander can positively retain its resiliency over a long period of use. However, this depth does not necessitate additional ring groove depth since the legs of the expander which provide this depth are telescoped over the confining ring. Thus, this expander requires only the radial depth necessary for the thickness of the struts and the small radial space which is normally maintained between the struts of the expander and the confining ring. This permits the depth of the ring groove to be reduced below that which is normally required. This is turn permits a thinner wall for the piston and thus, lighter, more efficient pistons.

The flexibility and degree of radial tension desired in the expander can be readily changed to meet varying operating circumstances since by lengthening the legs 16 and 17 the expander can be made more flexible. By reducing them the expander can be made less flexible. This can be done without changing the ring groove depth since the change in leg length is accommodated by greater or lesser telescoping of the legs of the expander about the confining ring. This gives the expander a marked degree of flexibility in application.

It is also an important characteristic of this expander that radial pressure is generated by the inherent characteristics of the expander body rather than by the compression of a resilient member between the inner face of the ring and the bottom of the ring groove. This is clearly brought out in FIG. 19 where the struts 15 of the expander 20 are clearly spaced radially from the bottom wall 85 of the ring groove 81. Thus, the expander without contact with the wall 80 is capable of forcing the ring 22 firmly against the cylinder wall 82. This feature is important because it eliminates the frictional resistance to ring rotation incident to a connecting contact between the ring and the bottom wall of the ring groove. It also eliminates the wear on both the expander and the ring incident to the fact that in conventional expander ring combinations the ring frequently has to rotate relative to the expander which is held against such rotation by frictional drag on the bottom of the ring groove. This expander also has the desirable characteristic of making multiple close spaced contact with the ring, thus, exerting uniform radial pressure on the ring at a large number of evenly spaced points about the ring. This is important in maintaining uniformity of sealing engagement between the ring and the cylinder wall throughout the circumference of the ring.

This invention permits a cast snap-ring to be used as a spacer for the rails. The cast snap-ring provides a spacer which can be machined to more uniform and flatter surface than can be obtained with spacers fabricated from thin sheet material. It also affords the rails more positive axial support against the inertia and momentum forces incident to piston reciprocation. This invention permits these advantages to be obtained from the use of the cast snap-ring without the inherent disadvantages of such a ring arising from its lack of radial tension and flexibility to conform to cylinder wall variations.

This invention also permits multiple ring effects to be combined in a single ring groove of conventional width. Thus, the contact between the snap-ring and the cylinder wall provides a back-up or auxiliary seal for the rails when the two are used in combination. This is an important consideration in improving the efficiency of modern engines.

While this invention has been described in several forms, it will be recognized that the illustrated forms are not exhaustive of all of the modifications which may be made of this invention without departing from the principles of the invention. All such modifications as incorporate the principles of the invention are to be considered to be included in the hereinafter appended claims, unless these claims, by their language, expressly state otherwise.

I claim:

1. A piston ring having a cylinder wall contacting member with an open part and an expander with a closed part, said expander being radially inward of said member; said member having recesses in the radially inner portion of both its upper and lower sides; the radially outer ends of said recesses being defined by radially inwardly facing walls; said expander circumferentially being a zig-zag spring and being U-shaped in cross section and having a pair of radially outwardly extending legs axially spaced by a plurality of struts; said legs telescoping about the radially inner portion of said member and received in said recesses; upon closing of said parts in said member and said rails, said expander being compressed circumferentially and exerting radial pressure on said member; the inner face of said member being radially spaced from said struts; the radially outer face of said member being upwardly and inwardly inclined so that the lower marginal corner of said member has the greatest dimension thereof; the radial distance between the lower one of said walls and radially inner portion of said expander is greater than the radial distance between the upper one of said walls and the radially inner portion of said expander for tilting said member into an upwardly and inwardly inclined attitude about said lower marginal corner thereof when said piston ring is confined in a cylinder.

2. A piston ring as described in claim 1 wherein the upper leg of said expander is longer than the lower leg thereof.

3. A piston ring as described in claim 1 wherein said upper one of said walls is radially offset inwardly from said lower one of said walls.

References Cited by the Examiner
UNITED STATES PATENTS

| | | | |
|---|---|---|---|
| 1,251,906 | 1/18 | Moratta | 277—198 |
| 1,500,252 | 7/24 | Marshall | 277—198 |
| 2,804,361 | 8/57 | Shirk | 277—140 |
| 3,050,354 | 8/62 | Marien | 277—188 |
| 3,066,943 | 12/62 | Brenneke | 277—139 |

EDWARD V. BENHAM, *Primary Examiner.*

SAMUEL ROTHBERG, LEWIS J. LENNY, *Examiners.*